United States Patent [19]
Semenzato

[11] Patent Number: 5,903,728
[45] Date of Patent: May 11, 1999

[54] PLUG-IN CONTROL INCLUDING AN INDEPENDENT PLUG-IN PROCESS

[75] Inventor: Luigi Semenzato, Oakland, Calif.

[73] Assignee: Microsoft Corporation, Redmond, Wash.

[21] Appl. No.: 08/841,835

[22] Filed: May 5, 1997

[51] Int. Cl.[6] .................................................... G06F 13/00
[52] U.S. Cl. .................. 395/200.47; 395/712; 395/677; 395/680
[58] Field of Search ..................................... 395/712, 677, 395/678, 200.32, 200.47, 200.48, 200.49, 200.53, 200.57, 680, 681, 682, 684, 685

[56] References Cited

U.S. PATENT DOCUMENTS

| | | | |
|---|---|---|---|
| 5,790,790 | 8/1998 | Smith et al. | 395/200.36 |
| 5,794,259 | 8/1998 | Kikinis | 707/507 |
| 5,802,518 | 9/1998 | Karaev et al. | 707/9 |
| 5,809,250 | 9/1998 | Kisor | 395/200.57 |

*Primary Examiner*—Viet D. Vu
*Attorney, Agent, or Firm*—Schwegman, Lundberg, Woessner & Kluth, P.A.

[57] ABSTRACT

A plug-in executes as a separate computer process from a platform process in which the plug-in is installed and which invokes execution of the plug-in. The plug-in therefore has a context which is independent of the context of the platform process. Specifically, the plug-in is separated into a plug-in controller and a plug-in body. The plug-in body is a collection of computer instructions execution of which perform the substantive task of the plug-in, i.e., the task by which the plug-in extends the functionality of the platform process. The plug-in controller is installed in the platform process as a plug-in using the plug-in installation mechanism of the platform process. Once invoked by the platform process, typically in response to user-generated signals received by the platform process, the plug-in controller invokes execution of the plug-in body as a separate computer process from the platform process. The platform process creates a window into which the plug-in can display images and information and passes to the plug-in controller a window identifier of the window to thereby grant the plug-in controller access to the window. The plug-in controller passes the window identifier to the plug-in body through an argument list in execution of the exec( ) system call. The plug-in body avoids deletion of the window by creating a sub-window of the window and manipulating the window hierarchy to prevent deletion of the sub-window as a consequence of deletion of the window provided by the platform process.

18 Claims, 9 Drawing Sheets

PLUG-IN CONTROL INCLUDING AN INDEPENDENT PLUG-IN PROCESS

FIELD OF THE INVENTION

The present invention relates to computer software and, in particular, to a plug-in mechanism whereby existing computer software application programs can be extended to include new functionality.

BACKGROUND OF THE INVENTION

Many computer programs which are commercially available today enable other software developers to add functionality to such application programs by providing a plug-in interface. A plug-in is a collection of computer instructions which is detected by a platform computer process at run-time and subsequently invoked during run-time. Briefly, the platform computer process is created by invocation of a platform computer program which can be purchased commercially or otherwise acquired from some source of computer programs. Of course, the platform computer program can also be developed by the developer of the plug-in as well. The platform computer process includes a mechanism by which separately provided plug-ins are detected and by which a user can invoke execution of any of the plug-ins.

As a result, a user can extend the functionality of the platform computer process by installing, and subsequently invoking execution of, various plug-ins. The user can thus customize the platform process to provide desired functionality while foregoing installation of plug-ins which provide functionality which is superfluous with respect to the particular needs of the user, which leads to conserving primary storage during execution and to preserving secondary storage in general. In addition, software developers other than the developer of the platform process can develop and provide plug-ins to provide functionality which is not envisioned by developer of the platform process, thereby enhancing of the functionality ultimately provided by the platform process through addition of such plug-ins.

Plug-ins are typically implemented as dynamically linked libraries (DLLs). DLLs are well-known but are described here briefly for completeness. A DLL is a library which is linked dynamically, i.e., at run-time. A library is a collection of computer instruction modules which can be invoked by computer instruction modules of another computer program. The inclusion of computer instruction modules of a library into a computer program is generally accomplished in a well-known mechanism called linking in which references to the computer instruction modules of the library are resolved into address offsets within the computer program. Computer instruction modules of a DLL are linked at run-time. Specifically, computer instruction modules of a DLL are loaded into the address space of a computer process and references to the computer instruction modules are resolved into the addresses of the loaded computer instruction modules. In general, a computer process is an execution of a computer program and includes, in addition to the computer instructions of the computer program, an execution state which in turn includes an address space.

While plug-ins are advantageous for the reasons given above, plug-ins which are unreliable can be a detriment to the platform computer process. For example, if a plug-in crashes, i.e., enters an invalid state such that execution of the plug-in cannot continue, the platform process crashes as well. Crashing the platform process can result in loss of data which is not saved outside the address space of the platform process and, in some cases, can corrupt data files by leaving the data files in an invalid, intermediate state from which a valid state cannot be recovered without data stored in the address space of the crashed platform process. While plug-ins are generally designed not to crash, plug-ins can include programing errors, particularly during development of the plug-in prior to commercial release and sometimes in early releases of the plug-in.

As a result, developing a plug-in requires frequent restarting of the platform process, since the plug-in is part of the platform process, after each such crash. The time required to start the platform process and achieve a particular state in the plug-in execution represents a significant portion of the time required to develop the plug-in. For example, a particular state of the platform process is sometimes required to test a particular feature of the plug-in and achieving that particular state sometimes requires an appreciable amount of time and effort by the developer of the plug-in.

During development of a plug-in, debugging, i.e., detecting and removing programming errors from, the plug-in sometimes requires that both the platform process and the plug-in are executed in the context of a debugger. A debugger is a computer process which provides an execution context for another, analyzed computer process whereby the developer can monitor various components of the execution state of the analyzed computer process to detect programing errors in the analyzed computer process such that removal of such programming errors is possible. Debuggers are rather complex computer processes themselves and often have bugs, i.e., programming errors, of their own. As a result, debuggers are less effective at monitoring large, complex computer processes. Thus, inclusion of a plug-in with a platform process reduces the effectiveness with which a debugger can detect programming errors in the platform process and/or the plug-in.

In addition, if a plug-in contains a resource leak, i.e., allocates but does not free resources, those resources are not recovered by the platform as available for subsequent reallocation when the plug-in is terminated. Since the plug-in is a component of the platform process, resources allocated, and thus reserved, by the plug-in are in actuality reserved by the platform process. However, the remainder of the platform process is generally unaware of the resources allocated by the plug-in and therefore cannot access or free such resources if the plug-in does not free such resources. Repeated resource leaks can cause a computer process to run entirely out of various resources while such resources are not actually in use.

Furthermore, plug-ins are typically limited to the context of the platform process. Specifically, if the platform process in single-threaded, i.e., can have only a single execution state at one time, the plug-in must also be single threaded in some operating systems. For example, such is true in the Solaris operating system, versions 2.5 and 2.5.1, available from Sun Microsystems, Inc. of Mountain View, Calif. Multi-threaded processes are known and are advantageous in that each thread of the process can be separately scheduled for execution by an operating system. As a result, the various threads of a single process can execute concurrently and each process can continue execution even if another of the threads has entered a wait state pending some event such as completion of an I/O access. Conversely, execution of the entirety of a single-threaded process is suspended if any component of the process enters a wait state. Since the platform process can be developed by a developer other than the developer of the plug-in, the developer of the plug-in may desire to implement the plug-in as multi-threaded but cannot change a single-threaded platform process to execute in a multi-threaded environment. In some operating environments, whether a process is single-threaded or multi-threaded is determined at run-time and cannot be changed subsequently. Therefore, in such an operating environment, a plug-in for a single-threaded platform must be single-threaded.

What is needed in the industry is a mechanism whereby plug-ins can extend the functionality of a platform process without subjecting the platform process to programing errors, resource leaks, and other failings of the plug-in. In addition, the ability to execute a multi-threaded plug-in from a single-threaded platform process is highly desirable.

SUMMARY OF THE INVENTION

In accordance with the present invention, a plug-in executes as a separate computer process from the platform process and therefore has a context which is independent of the context of the platform process. Specifically, the plug-in is separated into a plug-in controller and a plug-in body. The plug-in body is a collection of computer instructions execution of which perform the substantive task of the plug-in, i.e., the task by which the plug-in extends the functionality of the platform process. In one embodiment, the platform process is a World Wide Web browser for retrieving HTML documents through the Internet and the plug-in retrieves motion video and audio streams through the Internet and displays the retrieved streams in a window provided by the platform process. The plug-in further provides a graphical user interface by which a user can control the display of the motion video/audio streams to play, stop, pause, resume, fast-forward, rewind, etc., much like the controls on a typical video cassette recorder (VCR). In this embodiment, these functions are provided by the plug-in body which executes as a separate computer process.

The plug-in further includes a plug-in controller which is installed in the platform process as a plug-in using the plug-in installation mechanism of the platform process. The plug-in controller is, in one embodiment, invoked by loading an HTML document which includes an EMBED tag which identifies the plug-in controller. The platform process typically loads the HTML document in response to user-generated signals received by the platform process. Once invoked by the platform process, the plug-in controller invokes execution of the plug-in body as a separate computer process from the platform process. Specifically, the plug-in controller uses the fork( ) system call to create a duplicate of the platform process, which includes a duplicate of the plug-in controller. The duplicate of the plug-in controller uses the exec( ) system call to replace the computer instructions of the duplicate platform process with the computer instructions of the plug-in body. Accordingly, the plug-in body executes as a computer process which is separate and independent from the platform process.

As a result, any failure of the plug-in body does not cause failure of the platform process. In addition, the plug-in body can execute as a multi-threaded process notwithstanding execution of the platform process as a single-threaded computer process. The plug-in body can therefore avail itself of the various advantages of multi-threaded execution. In addition, termination of the plug-in body automatically frees all resources allocated to the plug-in body since resources allocated to a computer process are typically automatically freed by the operating system in which the computer process executed prior to termination. Conversely, termination of only a portion of a computer process does not automatically free resources allocated to the computer process by that portion. The present invention therefore represents a significant improvement over prior art plug-in mechanisms.

The platform process creates a window into which the plug-in can display images and information and passes to the plug-in controller a window identifier of the window to thereby grant the plug-in controller access to the window. The plug-in controller passes the window identifier to the plug-in body through an inter-process communications mechanism such as a socket pair. In one embodiment, the window identifier is entirely independent of the context of the platform process. In contrast, some identifiers used by the platform process are based on offsets into the address space of the platform process and are therefore dependent on the context of the platform process. In other words, access to the address space or other components of the execution state of the platform process are required to make use of such identifiers, and such identifiers are therefore dependent upon the context of the platform process. Conversely, the window identifier is independent of the context of the platform process and no information pertaining to the execution state or address space of the platform process is required to access the window through use of the window identifier. Accordingly, the plug-in body, which is a separate computer process from the platform process, needs only the window identifier to display images and information in the window and to receive notification of events associated with user manipulation of input devices which are associated with that window.

DETAILED DESCRIPTION

Figure 1:
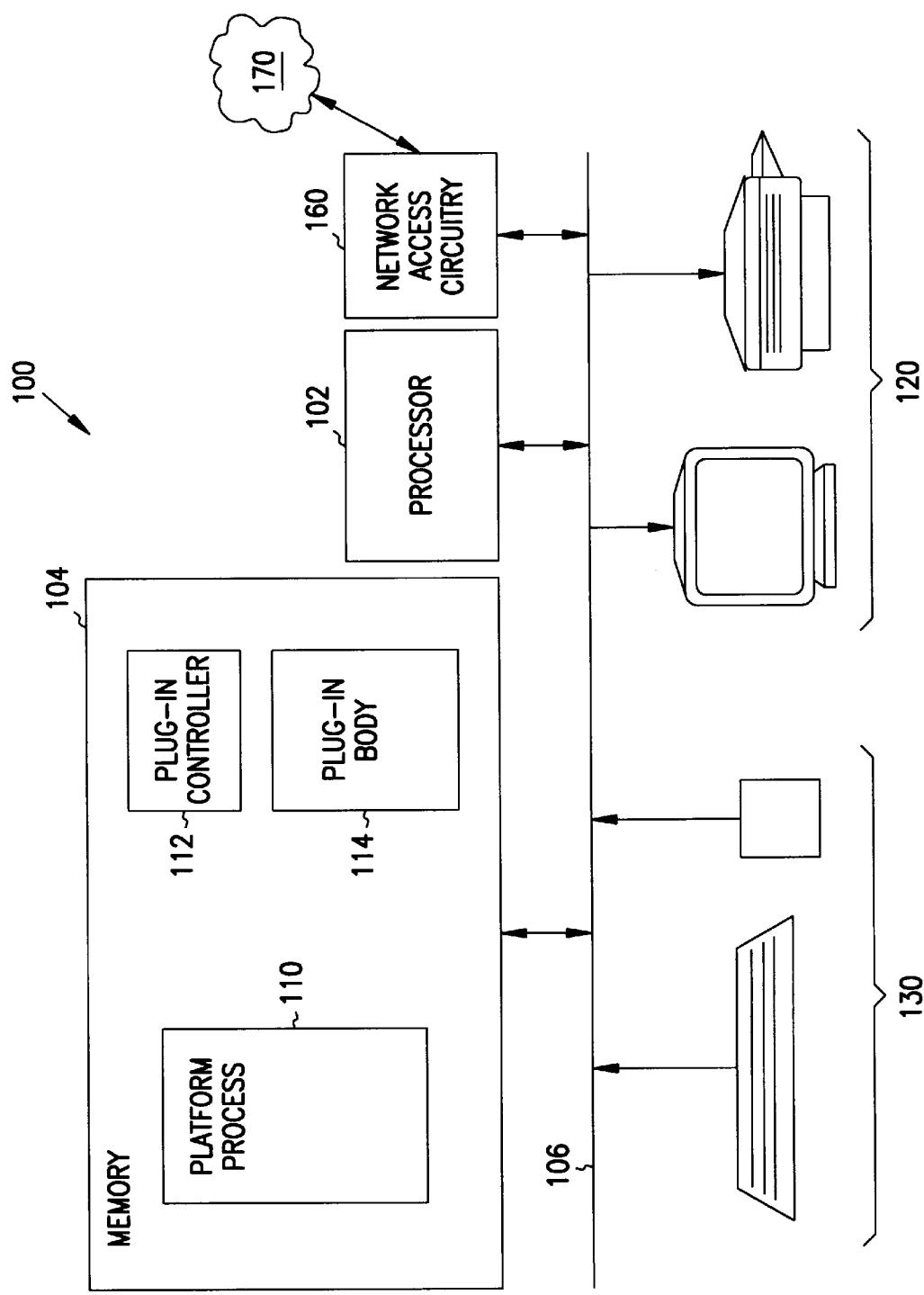
FIG. 1 is a block diagram of a computer system in which a platform process executes and in which a plug-in controller and plug-in body in accordance with the present invention operate.

In accordance with the present invention, a plug-in controller 112 (FIG. 1) is implemented as a plug-in of a platform process 110 and executes a plug-in body 114 as a separate computer process within computer system 100. As described more completely below, invocation of plug-in controller 112 causes plug-in controller 112 to be loaded into platform process 110 using a conventional plug-in mechanism. Plug-in controller 112 then executes plug-in body 114 as a computer process which is separate and distinct from platform process 110. Plug-in controller 112 and plug-in body 114 collectively form a novel plug-in for platform process 110. Plug-in controller 112 implements a simple interface with platform process 110 and controls execution of plug-in body 114 on behalf of platform process 110. Plug-in body 114 implements the substantive processing of the plug-in formed collectively by plug-in controller 112 and plug-in body 114 and is partially controlled by platform process 110 through plug-in controller 112. To facilitate appreciation of the present invention, the operating environment of platform process 110, plug-in controller 112, and plug-in body 114, i.e., computer system 100, is briefly described.

Computer system 100 includes a processor 102 and memory 104 which is coupled to processor 102 through an interconnect 106. Interconnect 106 can be generally any interconnect mechanism for computer system components and can be, for example, a bus, a crossbar, a mesh, a torus, or a hypercube. Processor 102 fetches from memory 104 computer instructions of a computer process such as platform process 110 and executes the fetched computer instructions. In addition, processor 102 can fetch computer instructions through computer network 170 through network access circuitry 160 such as a modem or ethernet network access circuitry. Processor 102 also reads data from and writes data to memory 104 and sends data and control signals through interconnect 106 to one or more computer display devices 120 and receives data and control signals through interconnect 106 from one or more computer user input devices 130 in accordance with fetched and executed computer instructions.

Memory 104 can include any type of computer memory and can include, without limitation, randomly accessible memory (RAM), read-only memory (ROM), and storage devices which include storage media such as magnetic and/or optical disks. Memory 104 stores platform process 110 which is a computer process which executes within processor 102 from memory 104. In addition, memory 104 stores plug-in controller 112 and plug-in body 114.

Each of computer display devices 120 can be any type of computer display device including without limitation a printer, a cathode ray tube (CRT), a light-emitting diode (LED) display, or a liquid crystal display (LCD). Each of computer display devices 120 receives from processor 102 control signals and data and, in response to such control signals, displays the received data. Computer display devices 120, and the control thereof by processor 102, are conventional.

Each of user input devices 130 can be any type of user input device including, without limitation, a keyboard, a numeric keypad, or a pointing device such as an electronic mouse, trackball, light-pen, touch-sensitive pad, digitizing tablet, thumb wheels, or joystick. Each of user input devices 130 generates signals in response to physical manipulation by a user and transmits those signals through interconnect 106 to processor 102.

In FIG. 1, platform process 110 executes within processor 102 from memory 104 and plug-in controller 112 and plug-in body 114 are dormant, i.e., are stored within memory 104 but are not executing within processor 102. As described briefly above, plug-in controller 112 is installed as a plug-in for platform process 110 in a conventional manner. In one embodiment, an identifier of plug-in controller 112 is included in a list of available plug-ins for platform process 110 and plug-in controller 112 is invoked by a user of computer system 110 through conventional user-interface techniques.

Figure 2A:
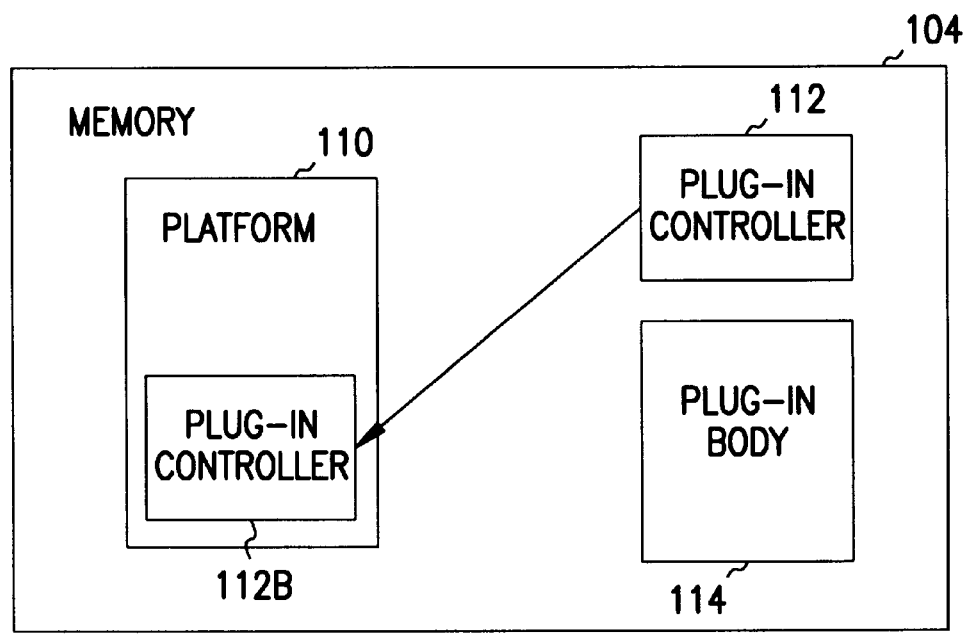
FIGS. 2A–C are block diagrams illustrating invocation of the plug-in body of FIG. 1 as a computer process which is separate from the platform process in accordance with the present invention.

Upon invocation, plug-in controller 112 is loaded into the address space of platform process 110, as indicated in FIG. 2A, to form plug-in controller 112B which proceeds to execute in processor 102 (FIG. 1). Execution of plug-in controller 112B upon invocation is illustrated in logic flow diagram 300 (FIG. 3) in which processing begins with step 302. In step 302, plug-in controller 112B (FIG. 2A) marshals in arguments received from platform process 110 by conventional operation of the conventional plug-in mechanism. Arguments are data by which one software module passes information to another software module. In this case, platform process 110 provides an environment within which a plug-in, such as plug-in controller 112B, can operate and provides to the plug-in information which specified the environment and grants the plug-in access to the environment. For example, platform process 110 provides to plug-in controller 112B a window identifier of a window into which images and information produced by the plug-in collectively formed by plug-in controller 112 and plug-in body 114 can be displayed.

Figure 2B:
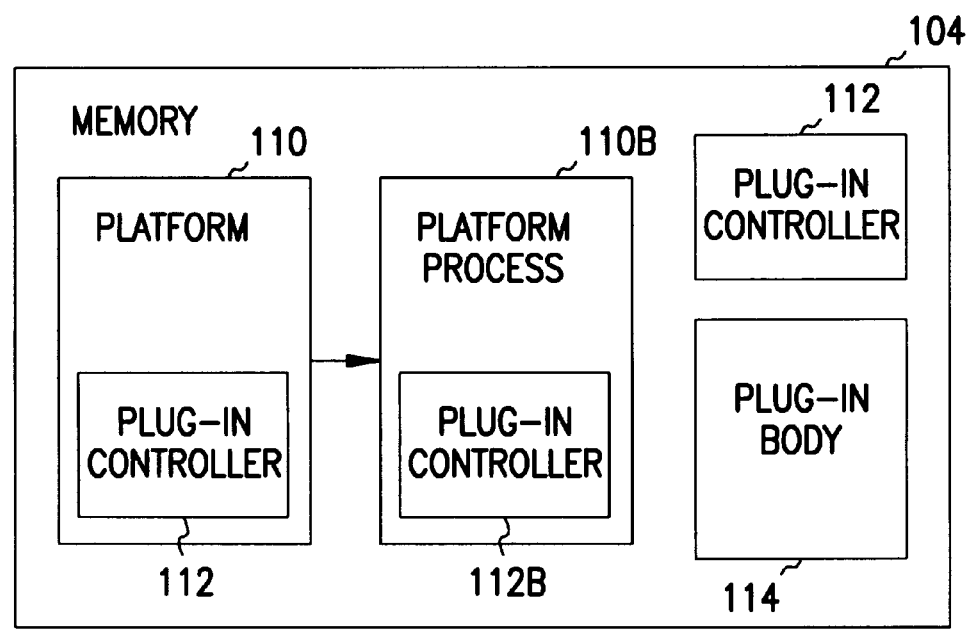
Figure 3:
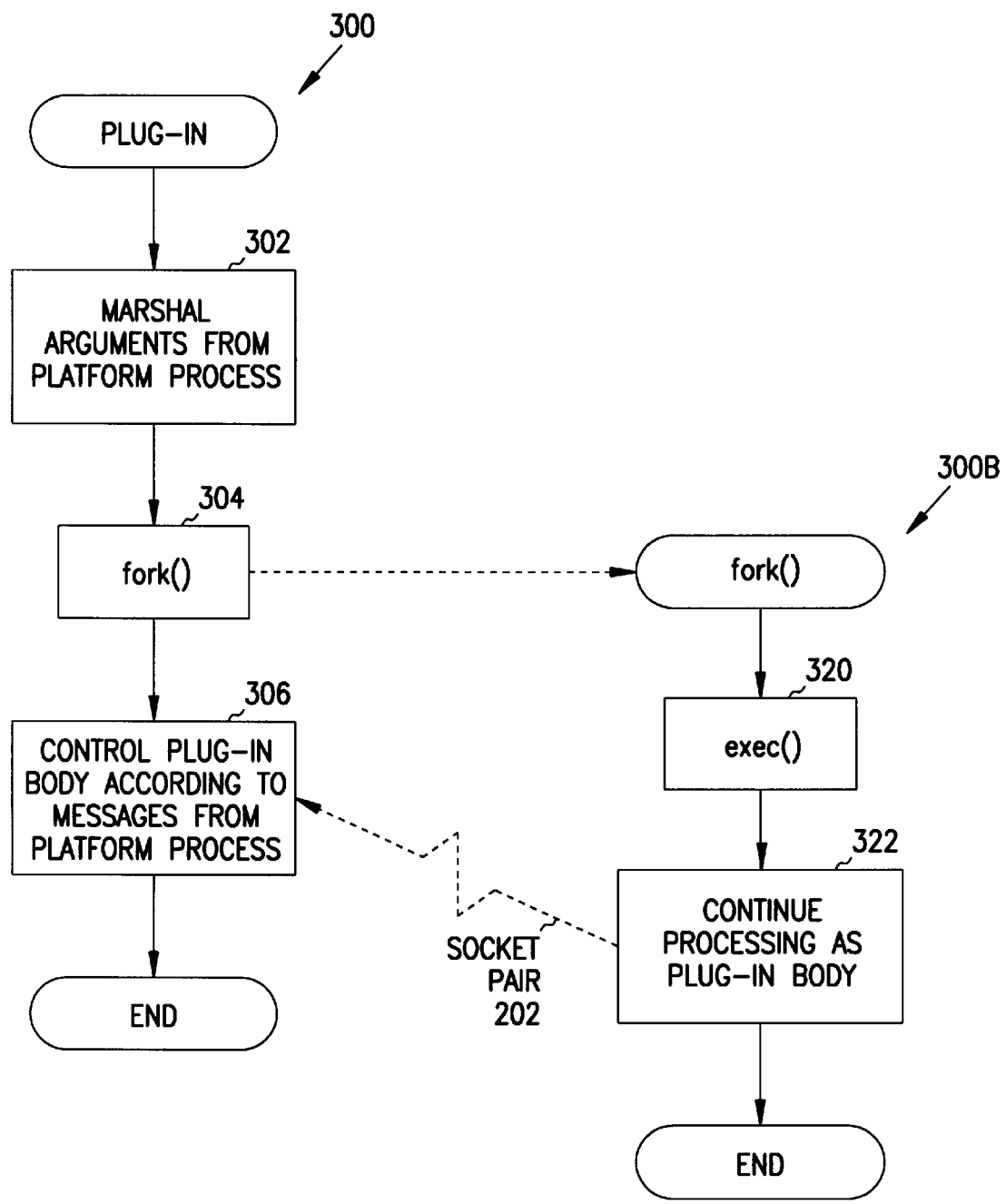
FIG. 3 is a logic flow diagram of the processing of the plug-in controller to invoke the plug-in body of FIG. 1 as a computer process which is separate from the platform process in accordance with the present invention.

After step 302, plug-in controller 112B (FIG. 2A) proceeds to initiate execution of plug-in body 114. Specifically, in step 304 to which processing transfers from step 302, plug-in controller 112B creates a duplicate process 110B (FIG. 2B) of platform process 110 by execution of the fork( ) system call. The fork( ) system call is a known component of the known UNIX operating system and is not described herein in detail. Briefly, execution of the fork( ) system call by an original computer process creates a duplicate computer process which executes independently of the original computer process. The duplicate computer process is identical to the original computer process with only one small exception. Each computer process includes as part of the state of the computer process a flag which indicates whether the computer process is the original or the duplicate, and each computer process can determine whether it is the original or the duplicate by reference to the flag. Duplicate process 110B includes a duplicate plug-in controller 112BB which executes independently of plug-in controller 112B. Plug-in controller 112B identifies itself as part of the original computer process and continues processing at step 306 (FIG. 3). Duplicate plug-in controller 112BB (FIG. 2B) identifies itself as part of the duplicate computer process and executes according to logic flow diagram 300B (FIG. 3) in which processing begins with step 320.

In step 320, duplicate plug-in controller 112BB (FIG. 23) executes the exec( ) system call. The exec( ) system call is a known component of the known UNIX operating system and is described herein only briefly for completeness. Execution of the exec( ) system call by an original computer process causes the original computer process to be replaced with a substitute computer process such that the computer instructions of the substitute computer process occupy the address space of the original computer process. The original computer process can pass information to the substitute computer process by including such information in the argument list of the exec( ) system call. Argument lists are well-known and are not described herein. In step 320, duplicate plug-in controller 112BB causes platform process 110B to be replaced by plug-in body 114 to thereby form plug-in body 114B (FIG. 2C) which is a computer process executing within computer system 100 (FIG. 1). In addition, duplicate plug-in controller 112BB (FIG. 2B) uses the argument list of the exec( ) system call to pass to plug-in body 114B (FIG. 2C) arguments marshaled in from platform process 110 by plug-in controller 112B in step 302 (FIG. 3) as described above. Duplicate plug-in controller 112BB (FIG. 2B) includes the arguments marshaled in by plug-in controller 112B because duplicate plug-in controller 112B is a duplicate of plug-in controller 112B which includes the arguments. Processing according to logic flow diagram 300B transfers to step 322 in which plug-in body 114B (FIG. 2C) continues processing according to the particular computer instructions of plug-in body 114.

Thus, plug-in controller 112B invokes execution of plug-in body 114B as a separate and independent computer process executing within computer system 100 (FIG. 1). In doing so, plug-in controller 112B creates and keeps a socket 202A which plug-in controller 112B uses to send and receive messages to and from, respectively, plug-in body 114B. Similarly, plug-in body 114B includes a socket 202B which plug-in body 114B uses to send messages to and receive messages from plug-in controller 112B. Sockets are well-known inter-process communication mechanisms and are not described further herein. Creation of sockets is similarly well-known.

In step 306, to which processing of plug-in controller 112B continues from step 304, plug-in controller 112B controls operation of plug-in body 114B in accordance with messages received by plug-in controller 112B from platform process 110. Plug-in controller 112B uses socket pair 202 to send control messages to and receive status messages from plug-in body 114B. In one embodiment, platform process 110 sends generally two types of messages to plug-in controller 112B, namely, a change window message and a terminate message. The change window message indicates that the window to which a plug-in can write images and information is about to be replaced with a new window, perhaps having a different size. The terminate message indicates that a plug-in is about to be terminated by platform process 110. In response to the terminate message, a conventional plug-in frees all allocated resources and saves in persistent memory of memory 104 (FIG. 1) any necessary data.

Plug-in body 114B (FIG. 2C) executes and behaves in accordance with the particular computer instructions included in plug-in body 114 as designed by the developer of plug-in body 114. In one embodiment, platform process 110 is the Netscape Navigator browser for retrieving HTML documents through the World Wide Web of the Internet, and plug-in body 114B retrieves motion video and audio streams and displays those streams in a window provided by platform process 110. Since plug-in body 114B is a separate computer process from platform process 110, failure of plug-in body 114B does not cause failure of platform process 110. Accordingly, time required to restart plug-in body 114B after such a failure does not require restarting platform process 110, saving time and user effort. In addition, plug-in body 114B can execute as a multi-threaded process even if platform process 110 is a single-threaded process. Plug-in body 114B can therefore avail itself of the benefits and efficiencies of multi-threaded processes notwithstanding the decision of the developer of platform process 110 that platform process 110 is to be single-threaded.

However, since plug-in body 114B is a separate computer process from platform process 110, plug-in body 114B cannot generally use information which is specific to the address space of platform process 110. In general, any processing which requires such information must be carried out by plug-in controller 112B. In the X Windows programming environment of the UNIX operating system, window identifiers are used to identify windows to which images and information can be written for display in one or more of computer display devices 120 and are independent of the address space of the computer process which creates the window. Therefore, plug-in body 114B can receive and use a window identifier of a window created by platform process 110 for the purpose of display by plug-in body 114B of images and information. In one embodiment, plug-in body 114B receives the window identifier from plug-in controller 112B through the argument list of the exec( ) system call executed in step 320 (FIG. 3) which is described above.

Figure 4:
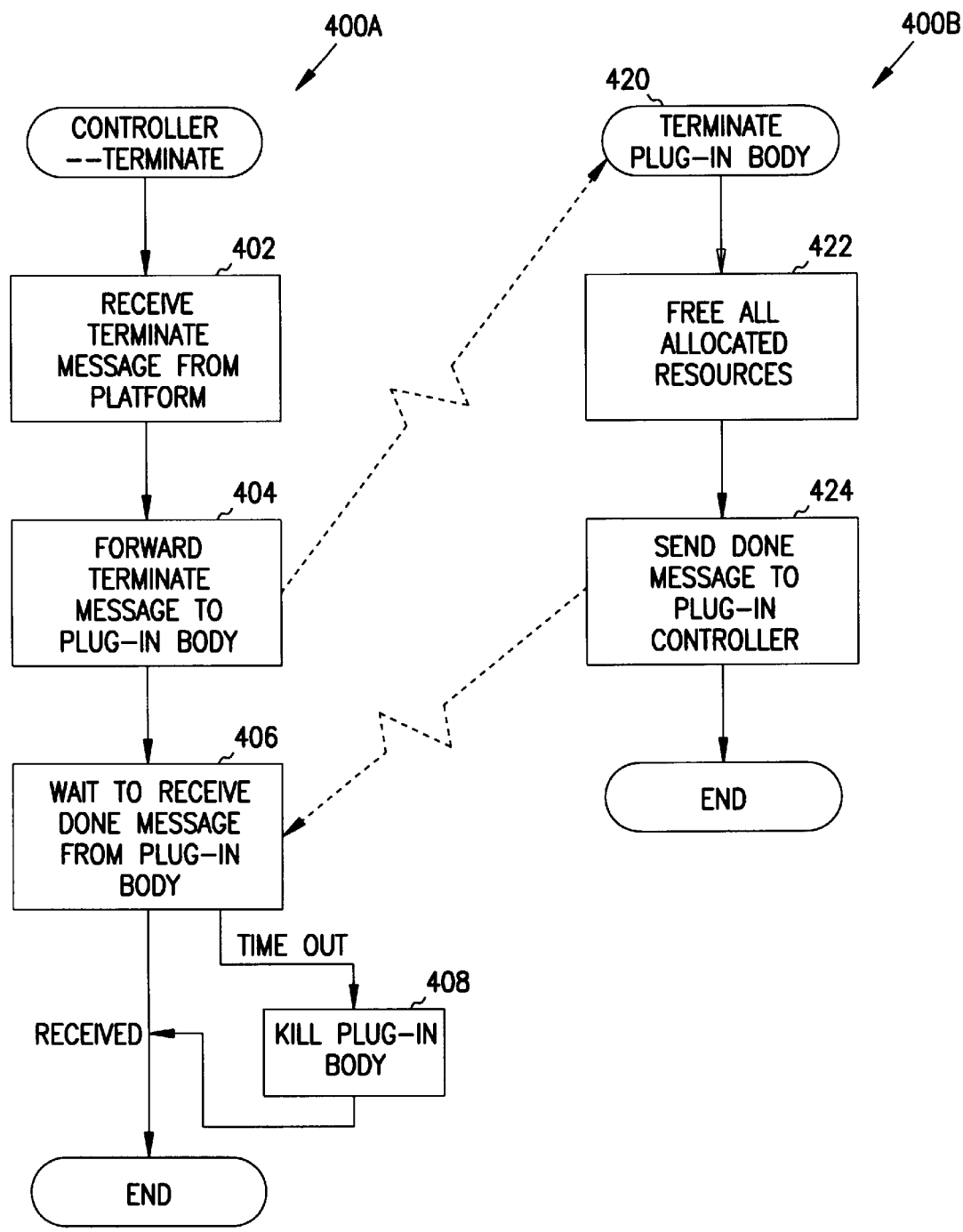
FIG. 4 is a logic flow diagram of the termination of the plug-in body in response to a terminate message received by the plug-in controller from the platform process of FIG. 1.

Processing by plug-in controller 112B and plug-in body 114B in response to a terminate message from platform process 110 is shown in logic flow diagrams 400A (FIG. 4) and 400B, respectively. In step 402, plug-in controller 112B (FIG. 2C) receives the terminate message from platform process 110. Processing transfers to step 404 (FIG. 4) in which plug-in controller 112B (FIG. 2C) sends the terminate message to plug-in body 114B through sockets 202A–B. In response to the received terminate message, plug-in body 114B begins performance of a terminate procedure as represented by begin step 420 (FIG. 4). In step 422, plug-in body 114B frees all resources allocated by plug-in body 114B and saves in persistent memory of memory 104 (FIG. 1) any data which plug-in body 114B (FIG. 2C) is programmed to save for subsequent invocations of plug-in body 114. Processing transfers to step 424 (FIG. 4) in which plug-in body 114B (FIG. 2C) sends a message to plug-in controller 112B to indicate that plug-in body 114B is about to terminate its own execution. After step 424 (FIG. 4), plug-in body 114B terminates its own execution.

From step 404, processing by plug-in controller 112B transfers to step 406 in which plug-in controller 112B waits to receive a message from plug-in body 114B that execution of plug-in body 114B is about to terminate. If such a message is received, processing by plug-in controller 112B terminates and platform process 110 subsequently removes plug-in controller 112B from the address space of platform process 110. Conversely, if no such message is received within a predetermined amount of time, plug-in controller 112B assumes that plug-in body 114B cannot complete performance of step 422 and terminates plug-in body 114B using the known kill( ) system call. All resources allocated by plug-in body 114B are freed and made available for subsequent reservation by other computer processes notwithstanding failure of plug-in body 114B to successfully perform step 422. Therefore, plug-in body 114B cannot leak resources.

As described briefly above, platform process 110 provides a processing environment for a plug-in such as the one formed collectively by plug-in controller 112 and plug-in body 114. Specifically, platform process 110 provides a window 606 (FIG. 6) which is displayed within computer display device 120A of computer display devices 120 (FIG. 1) and which has a state which is maintained within memory 104. Window 606 (FIG. 6) is identified by a window identifier which platform process 110 passes to plug-in body 114B (FIG. 2C) in the manner described above. Plug-in body 114B therefore has access to window 606 and can display images and information in window 606 (FIG. 6).

Figure 2C:
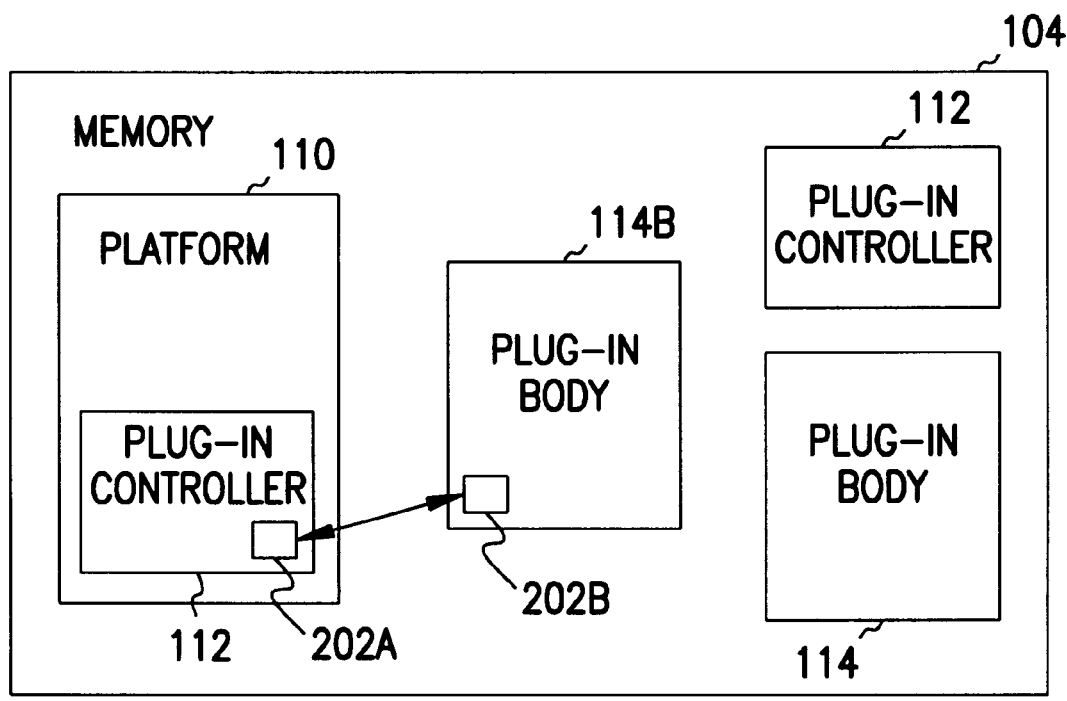

Windows are known but are described briefly for completeness. A window resembles a partitioned portion of a computer display and is a virtual display to which an individual computer process has exclusive access, i.e., in which the computer process can display graphical data without interference from other computer processes. In some windows-based environments, such as the X Windows operating environment of the UNIX operating system, have a window hierarchy in which each window is a sub-window of another window. Only one window, referred to as the root window, is the sub-window of no other. Root window 602 is shown in FIGS. 6A–E. Platform process 110 (FIG. 2C)

creates a window 604 (FIG. 6) and creates window 606 as a sub-window of window 604 to create a virtual display for plug-in controller 112B to display images and information.

In one embodiment, platform process 110 includes a user-interface mechanism whereby a user can cause window 604 to be resized and/or moved by physical manipulation of one or more of user input devices 130 (FIG. 1). In this embodiment, platform process 110 repositions window 606 (FIG. 6), e.g., to keep window 606 in a desired position relative to the position of window 604, by deleting window 606 and creating a new window of the new window size. Since plug-in body 114B executes as a computer process which is separate from platform process 110, careful synchronization between platform process 110 and plug-in body 114B can be required to terminate display of graphical data in the old, deleted window and to resume display of the graphical data in the new window. Such is particularly true if the graphical data is a motion video stream in which continuity between the motion video image of the old, deleted window and the motion vide image of the new window is desired. While, in some embodiments, it is possible to configure platform process 110 to simply move the window rather than delete and replace the window, in other embodiments, platform process 110 is developed and implemented by software engineers other than those developing and implementing plug-in controller 112 and plug-in body 114. As a result, such reconfiguration of platform process 110 is not feasible for software engineers developing and implementing plug-in controller 112 and plug-in body 114.

Thus, prior to displaying any images or information in window 606 (FIG. 6A), plug-in body 114B (FIG. 2C) creates a new window 608 (FIG. 6B) which is a sub-window of window 606 and to which plug-in body 114B displays images and information. Window 608 is positioned to cover the entirety of window 606, i.e., has the same position and size of window 606. For clarity, window 608 is shown as slight offset from window 606 in FIG. 6B while in practice window 606 is completely occluded by window 608. Plug-in body 114B displays images and information in window 608 rather than in window 606 to obviate redisplay of the displayed contents of window 608 in the event of a resize or repositioning or other change of window 606 by platform process 110 in which window 606 is deleted by platform process 110.

Figure 5:
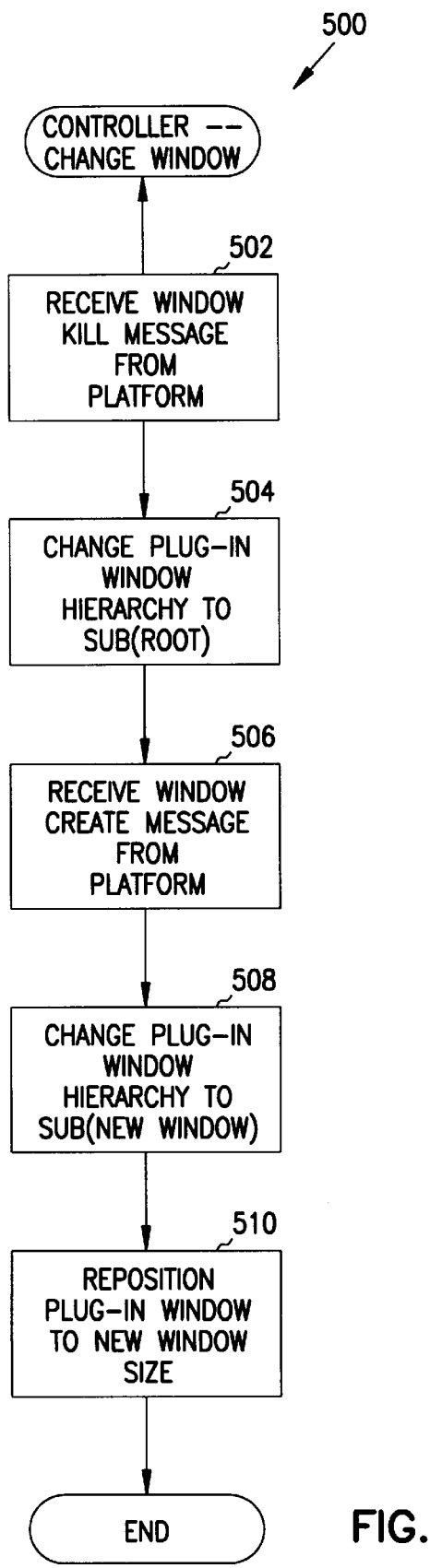
FIG. 5 is a logic flow diagram of the changing of the window provided by the platform process as performed by the plug-in controller and the plug-in body of FIG. 1.

The processing of a change window message by plug-in controller 112B (FIG. 2C) is illustrated in logic flow diagram 500 (FIG. 5) in which processing begins in step 502. In step 502, plug-in controller 112B (FIG. 2C) receives a kill window message from platform process 110. In step 504 (FIG. 5), plug-in controller 112B (FIG. 2C) changes the window hierarchy within computer system 100 (FIG. 1) such that window 608 (FIG. 6B) is an immediate sub-window of root window 602 rather than window 606. The mechanisms by which plug-in controller 112B (FIG. 2C) changes the hierarchical relationships of windows in the known X Windows operating environment of the known UNIX operating system are conventional and well known. Accordingly, deletion of window 606 (FIG. 6B) by platform process 110, which also deletes all sub-windows of window 606, does not delete window 608 (FIG. 6C) which is now a immediate sub-window of root window 602.

Figure 6A:
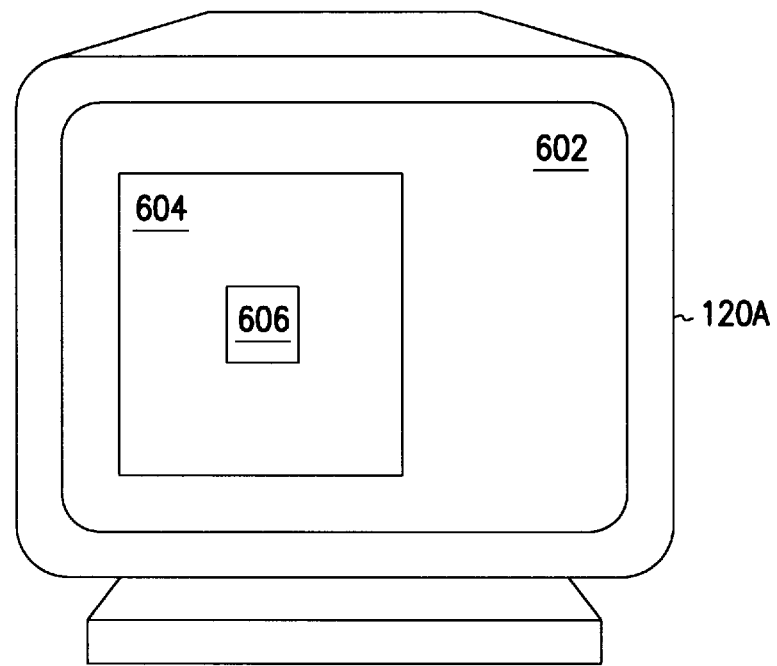
FIGS. 6A–E are screen view diagrams of the changing of the window provided by the platform process of FIG. 1 according to the logic flow diagram of FIG. 5.
Figure 6B:
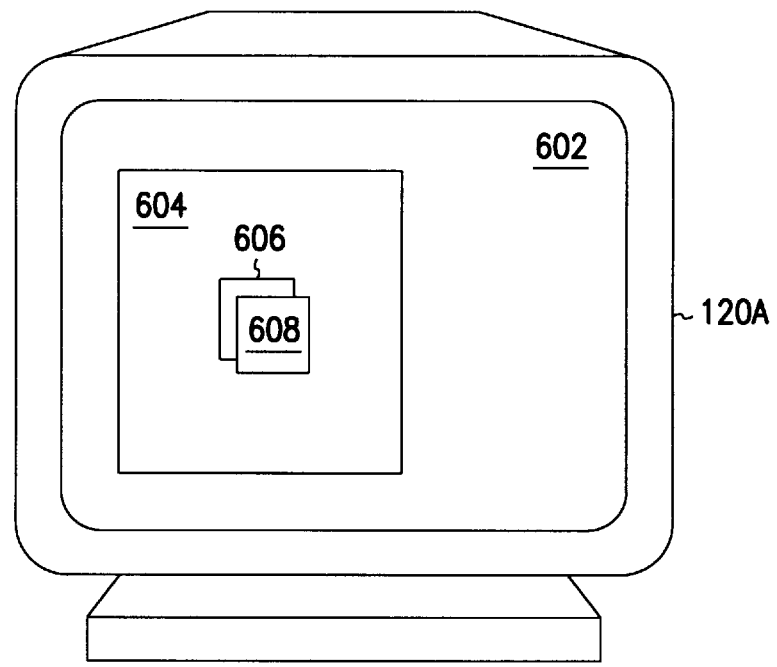
Figure 6C:
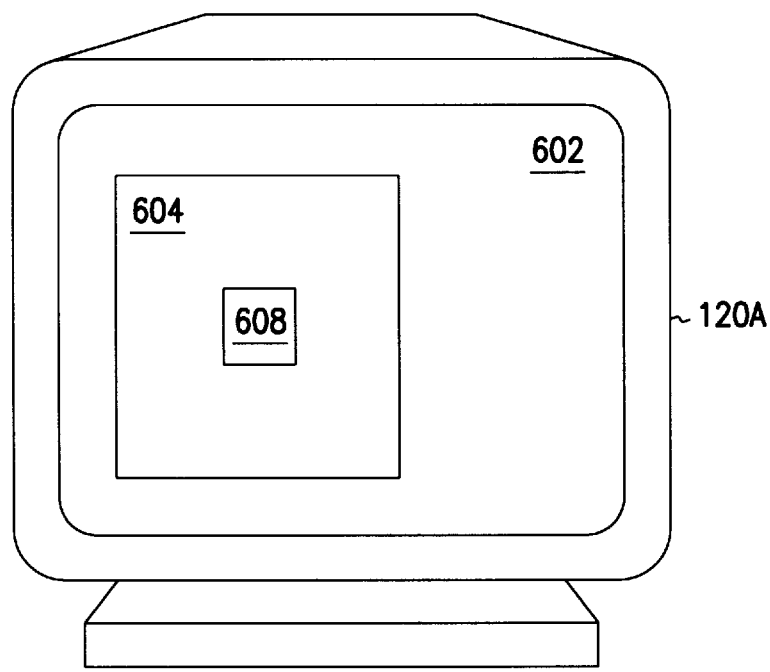
Figure 6D:
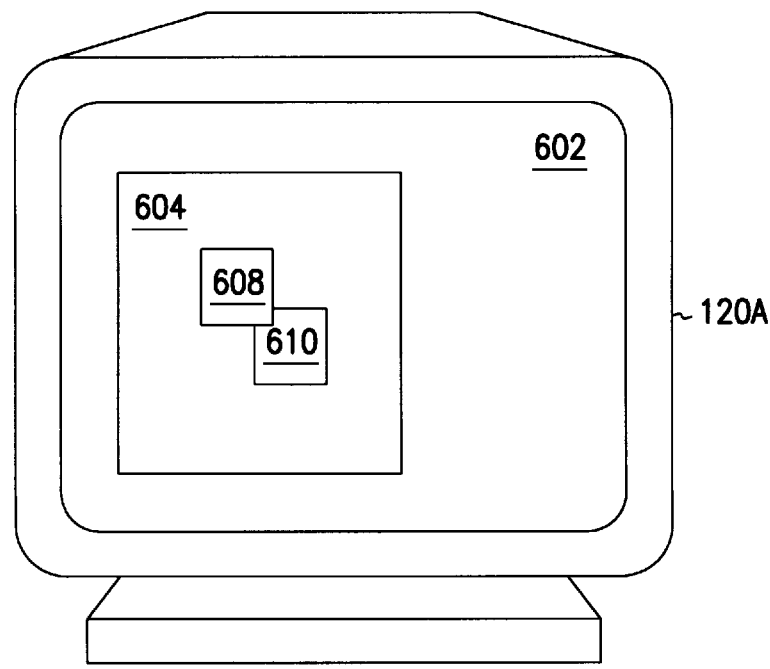

Platform process 110 (FIG. 2C) subsequently deletes window 606 as shown in FIG. 6C. However, since window 608 is an immediate sub-window of root window 602 and is therefore not a sub-window of window 606, window 608 survives deletion of window 606. Platform process 110 then creates a new window 610 (FIG. 6D) with a new position and/or size and sends to plug-in controller 112B (FIG. 2C) a new window message which includes the window identifier of new window 610 (FIG. 6D).

Figure 6E:
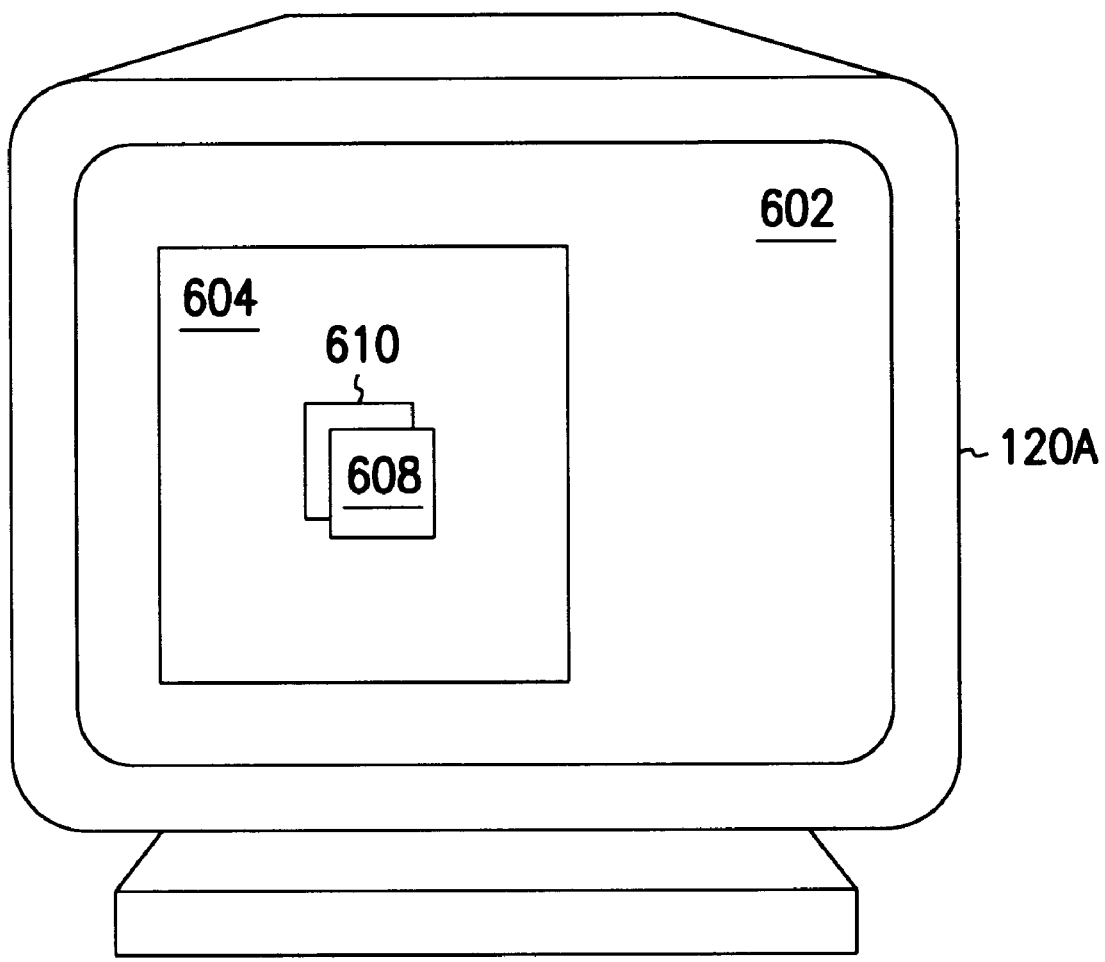

Processing by plug-in controller 112B (FIG. 2C) transfers from step 504 (FIG. 5) to step 506 in which plug-in controller 112B (FIG. 2C) receives a new window message from platform process 110 which identifies a newly created window which replaces the deleted window and to which a plug-in can display images and information. Processing transfers to step 508 (FIG. 5) in which plug-in controller 112B changes the window hierarchy within computer system 100 such that window 608 (FIG. 6D) is an immediate sub-window of new window 610 rather than root window 602. Processing by plug-in controller 112B (FIG. 2C) transfers to step 510 (FIG. 5) in which plug-in controller 112B repositions window 608 (FIG. 6D) to have the same size and position of new window 610 as shown in FIG. 6E.

Thus, window 610 is never deleted but is only moved and/or resized. Therefore, the graphical contents of window 610 can be easily updated by instructing plug-in body 114B to re-display the graphical contents of window 610. If plug-in body 114B displays a motion video stream in window 610, plug-in body 114 updates the graphical content of window 610 (FIG. 6E) simply by displaying the next frame of the motion video stream in window 610. Accordingly, the state of window 610 survives deletion of window 606, and recreation of the state of window 610 immediately prior to the deletion of window 606 from a lengthy motion video stream is obviated.

The above description is illustrative only and is not limiting. The present invention is limited only by the claims which follow.

What is claimed is:

1. A method for invoking a plug-in body by a platform computer process which has a platform context, the method comprising:

invoking a plug-in controller using a plug-in invocation mechanism; and invoking the plug-in body as a separate computer process from the platform process such that the plug-in body has a plug-in context which is independent of the platform context by creating a duplicate platform process and replacing the duplicate platform process with the plug-in body to form the separate computer process.

2. The method of claim 1 wherein creating a duplicate platform process comprises:

duplicating the platform process, which includes the plug-in controller, to form a separate duplicate platform process, which includes a duplicate plug-in controller.

3. A method for invoking a plug-in body by a platform computer process which has a platform context, the method comprising:

invoking a plug-in controller using a plug-in invocation mechanism;

invoking the plug-in body as a separate computer process from the platform process such that the plug-in body has a plug-in context which is independent of the platform context; and controlling operation of the separate computer process of the plug-in body through an inter-process communication mechanism between the separate computer process and the plug-in controller of the platform process.

4. The method of claim 1 further comprising:

creating, by operation of the platform process, an environment within which the separate computer process can display information; and providing to the separate computer process environment information sufficient to allow the separate computer process to gain access to the environment.

5. The method of claim 4 wherein the environment is a window.

6. The method of claim 4 wherein the environment information is independent of the platform context.

7. A computer system comprising:

a processor;

a memory operatively coupled to the processor;

a platform process which executes in the processor from the memory and which has a platform context;

a plug-in controller stored in the memory and which is configured such that the platform process can invoke execution of the plug-in controller in the platform context, and which is further configured to invoke execution of a plug-in body as a separate computer process in a plug-in context which is independent of the platform context by creating a duplicate platform process and replacing the duplicate platform process with the plug-in body to form the separate computer process.

8. The computer system of claim 7 wherein the plug-in controller is configured to invoke execution of the plug-in body as a separate computer process by:

duplicating the platform process to form a separate duplicate platform process; and replacing the duplicate platform process with the plug-in body to form the separate computer process.

9. A computer system comprising:

a processor;

a memory operatively coupled to the processor;

a platform process which executes in the processor from the memory and which has a platform context;

a plug-in controller stored in the memory and which is configured such that the platform process can invoke execution of the plug-in controller in the platform context, and which is further configured to invoke execution of a plug-in body as a separate computer process in a plug-in context which is independent of the platform context, wherein the plug-in controller is further configured to control operation of the separate computer process of the plug-in body through an inter-process communication mechanism between the separate computer process and the plug-in controller of the platform process.

10. The computer system of claim 7 wherein the platform process can create an environment within which the separate computer process can display information and can further provide environment information to the plug-in controller wherein the environment information is sufficient to allow the plug-in controller access to the environment; and further wherein the plug-in controller is further configured to provide the environment information to the plug-in body in response to receipt of the environment information to thereby grant the plug-in body access to the environment.

11. The computer process of claim 10 wherein the environment is a window.

12. The computer system of claims 10 wherein the environment information is independent of the platform context.

13. A computer readable medium which includes computer executable instructions which comprise:

a plug-in body; and a plug-in controller which is configured such that a platform process can invoke execution of the plug-in controller in a platform context in which the platform process executes, and which is further configured to invoke execution of the plug-in body as a separate computer process in a plug-in context which is independent of the platform context by creating a duplicate platform process and replacing the duplicate platform process with the plug-in body to form the separate computer process.

14. The computer readable medium of claim 13 wherein the plug-in controller is configured to invoke execution of the plug-in body as a separate computer process by:

duplicating the platform process to form a separate duplicate platform process; and replacing the duplicate platform process with the plug-in body to form the separate computer process.

15. A computer readable medium which includes computer executable instructions which comprise:

a plug-in body; and a plug-in controller which is configured such that a platform process can invoke execution of the plug-in controller in a platform context in which the platform process executes, and which is further configured to invoke execution of the plug-in body as a separate computer process in a plug-in context which is independent of the platform context, wherein the plug-in controller is further configured to control operation of the separate computer process of the plug-in body through an inter-process communication mechanism between the separate computer process and the plug-in controller of the platform process.

16. The computer readable medium of claim 13 wherein the platform process can create an environment within which the separate computer process can display information and can further provide environment information to the plug-in controller wherein the environment information is sufficient to allow the plug-in controller access to the environment; and further wherein the plug-in controller is further configured to provide the environment information to the plug-in body in response to receipt of the environment information to thereby grant the plug-in body access to the environment.

17. The computer readable medium of claim 16 wherein the environment is a window.

18. The computer readable medium of claim 16 wherein the environment information is independent of the platform context.

* * * * *